US008898807B2

(12) United States Patent
Chen

(10) Patent No.: US 8,898,807 B2
(45) Date of Patent: Nov. 25, 2014

(54) DATA PROTECTING METHOD, MOBILE COMMUNICATION DEVICE, AND MEMORY STORAGE DEVICE

(71) Applicant: Phison Electronics Corp., Miaoli (TW)

(72) Inventor: Meng-Chang Chen, Miaoli County (TW)

(73) Assignee: Phison Electronics Corp., Miaoli (TW)

( * ) Notice: Subject to any disclaimer, the term of this patent is extended or adjusted under 35 U.S.C. 154(b) by 23 days.

(21) Appl. No.: 13/719,237

(22) Filed: Dec. 19, 2012

(65) Prior Publication Data

US 2014/0109242 A1    Apr. 17, 2014

(30) Foreign Application Priority Data

Oct. 11, 2012  (TW) .............................. 101137502 A

(51) Int. Cl.
*G06F 21/00* (2013.01)
*H04L 29/06* (2006.01)
*G06F 21/10* (2013.01)

(52) U.S. Cl.
CPC ................ *H04L 63/12* (2013.01); *G06F 21/10* (2013.01); *H04L 63/0428* (2013.01)
USPC .......................................................... 726/30

(58) Field of Classification Search
CPC ..... H04L 63/12; H04L 63/0428; G06F 21/10; G06F 21/14
USPC .......................................................... 726/30
See application file for complete search history.

(56) References Cited

U.S. PATENT DOCUMENTS

| | | | |
|---|---|---|---|
| 6,301,471 B1* | 10/2001 | Dahm et al. ................... | 455/405 |
| 8,583,794 B2* | 11/2013 | Tanizawa et al. .............. | 709/225 |
| 2006/0154647 A1* | 7/2006 | Choi .............................. | 455/411 |
| 2007/0226809 A1* | 9/2007 | Ellard ............................ | 726/30 |
| 2007/0234062 A1* | 10/2007 | Friedline ....................... | 713/183 |
| 2007/0294528 A1* | 12/2007 | Shoji et al. .................... | 713/159 |
| 2008/0244732 A1* | 10/2008 | Coninck et al. ................ | 726/17 |
| 2009/0061911 A1* | 3/2009 | Ting et al. ...................... | 455/466 |
| 2010/0058073 A1* | 3/2010 | Ng et al. ........................ | 713/193 |
| 2012/0060209 A1* | 3/2012 | Leu ................................ | 726/7 |
| 2013/0339732 A1* | 12/2013 | Nagai et al. ................... | 713/168 |

\* cited by examiner

*Primary Examiner* — Justin T Darrow
*Assistant Examiner* — Shahriar Zarrineh
(74) *Attorney, Agent, or Firm* — Jianq Chyun IP Office

(57) ABSTRACT

A data protecting method for a mobile communication device is provided. The data protecting method includes storing first authentication information into a hidden area of a memory storage device coupled to the mobile communication device. The data protecting method also includes receiving a data packet containing a data security instruction and second authentication information via a mobile communication data network or a wireless network and determining whether the second authentication information obtained from the data packet matches the first authentication information stored in the hidden area. The data protecting method further includes, when the second authentication information obtained from the data packet matches the first authentication information stored in the hidden area, performing a data protecting operation on data stored in a storage area to prevent the data from being read. Thereby, the data can be effectively protected when the mobile communication device is lost.

17 Claims, 7 Drawing Sheets

DATA PROTECTING METHOD, MOBILE COMMUNICATION DEVICE, AND MEMORY STORAGE DEVICE

CROSS-REFERENCE TO RELATED APPLICATION

This application claims the priority benefit of Taiwan application serial no. 101137502, filed on Oct. 11, 2012. The entirety of the above-mentioned patent application is hereby incorporated by reference herein and made a part of this specification.

BACKGROUND

1. Technology Field

The present invention relates to a data protecting method and a mobile communication device using the same and a memory storage device thereof.

2. Description of Related Art

Along with the development of mobile communication technologies, features of smart phones have been constantly enhanced. Thus, people have tended more and more to record their daily events with smart phones. Particularly, the capacity of memory cards used in smart phones has been continuously increasing so that more data can be stored in these memory cards. For example, one can take pictures by using the camera function of a smart phone and store the pictures in the smart phone to browse them later on. Or, one can use a smart phone to record personal data, such as diaries, travel journals, and itineraries.

As mentioned above, smart phones are very powerful in the processing of personal data. However, if a smart phone is lost, the data stored therein may be misappropriated or even illegally distributed. Thus, how to prevent personal data from being misappropriated when a smart phone is lost is a major subject in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data protecting method, a mobile communication device, and a memory storage device, in which data is effectively prevented from being read by unauthorized users.

An exemplary embodiment of the present invention provides a data protecting method for a mobile communication device. The mobile communication device includes a security unit, a wireless communication unit, and an external device interface unit. A memory storage device is detachably coupled to the external device interface unit. The data protecting method includes storing first authentication information into a hidden area of the memory storage device by using the security unit. The data protecting method also includes receiving a data packet containing a data security instruction and a second authentication information by using the wireless communication unit, parsing the data packet according to the data security instruction by using the security unit to obtain the second authentication information, and determining whether the second authentication information obtained from the data packet matches the first authentication information stored in the hidden area by using the memory storage device. The data protecting method further includes, when the second authentication information obtained from the data packet matches the first authentication information stored in the hidden area, performing a data protecting operation on data stored in a storage area by using the memory storage device to prevent the data stored in the storage area from being read.

An exemplary embodiment of the present invention provides a mobile communication device including a microprocessor, a wireless communication unit, an external device interface unit, and a security unit. The wireless communication unit is coupled to the microprocessor. The external device interface unit is coupled to the microprocessor. A memory storage device is detachably coupled to the external device interface unit. The security unit is coupled to the microprocessor. The security unit stores first authentication information into a hidden area of the memory storage device. The wireless communication unit receives a data packet, where the data packet contains a data security instruction and a second authentication information. The security unit parses the data packet according to the data security instruction to obtain the second authentication information, and the memory storage device determines whether the second authentication information obtained from the data packet matches the first authentication information stored in the hidden area. If the second authentication information obtained from the data packet matches the first authentication information stored in the hidden area, the memory storage device performs a data protecting operation on data stored in a storage area to prevent the data stored in the storage area from being read.

An exemplary embodiment of the present invention provides a memory storage device including a connector, a rewritable non-volatile memory module, and a memory controller. The rewritable non-volatile memory module includes a hidden area and a storage area. The memory controller is coupled to the connector and the rewritable non-volatile memory module. The memory controller writes a device identity (ID) of a mobile communication device, a first digest, and a first encrypted data into the hidden area, where the first digest is generated by encoding a user account and a user password through a one-way hash encoding unit, and the first encrypted data is generated by encrypting the user account and the user password through an encryption unit. The memory controller further receives a second digest and a second encrypted data, decrypts the second encrypted data to obtain an account and a password, decrypts the first encrypted data to obtain the user account and the user password, and determines whether the second digest matches the first digest stored in the hidden area. If the second digest matches the first digest stored in the hidden area, the memory controller further determines whether the user account matches the account and whether the user password matches the password. If the user account matches the account and the user password matches the password, the memory controller performs a data protecting operation on data stored in the storage area to prevent the data stored in the storage area from being read.

As described above, in the data protecting method, the mobile communication device, and the memory storage device provided by exemplary embodiments of the present invention, a data security operation can be performed according to a data packet received from a user to prevent personal data from being misappropriated.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
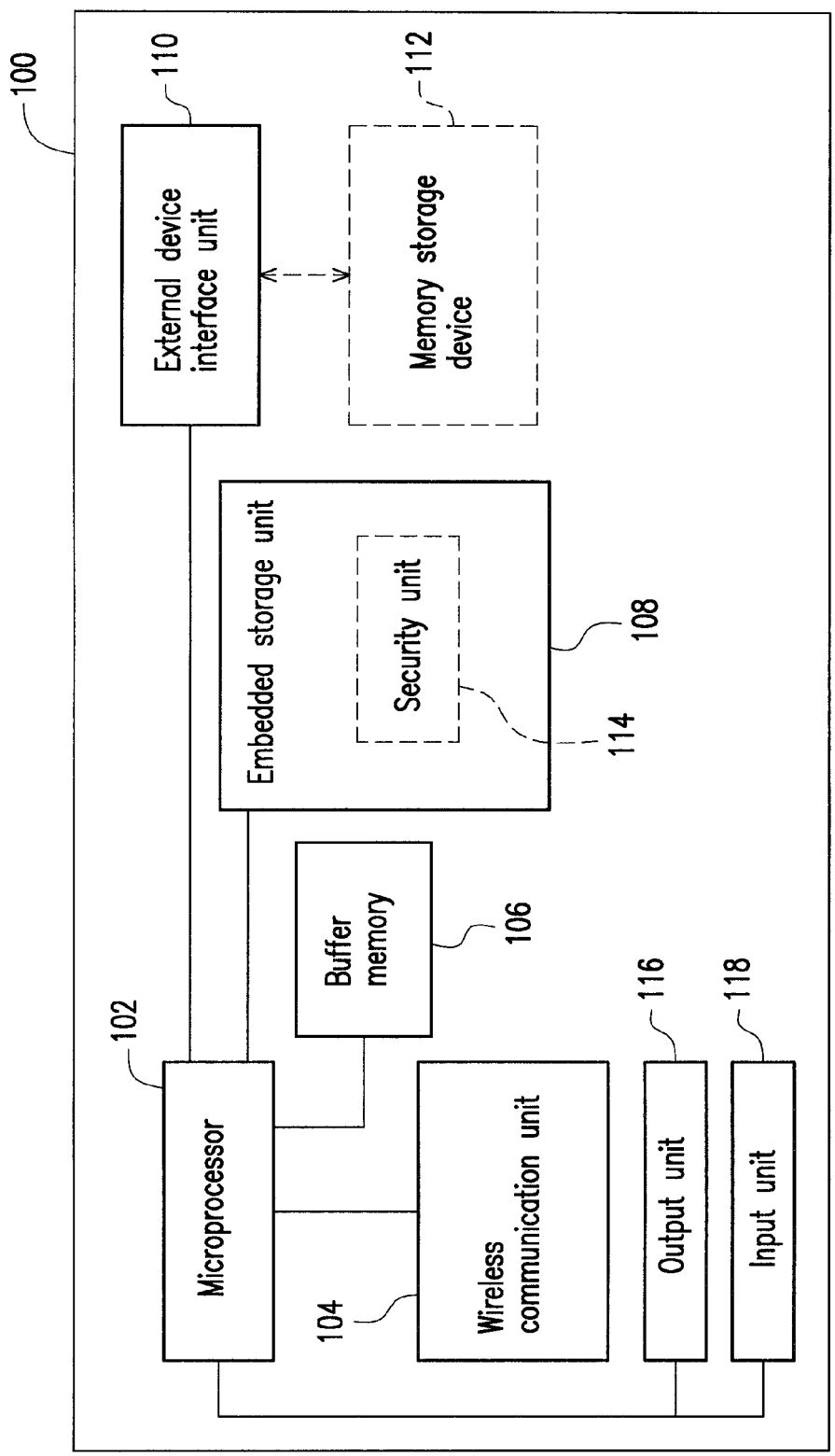
FIG. 1 is a schematic block diagram of a mobile communication device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic block diagram of a mobile communication device according to an exemplary embodiment of the present invention.

Referring to FIG. 1, the mobile communication device 100 includes a microprocessor 102, a wireless communication unit 104, a buffer memory 106, an embedded storage unit 108, an external device interface unit 110, a memory storage device 112, a security unit 114, an output unit 116, and an input unit 118. The mobile communication device 100 may be a cell phone, a personal digital assistant (PDA), a smart phone, a mobile navigation device, a personal computer (PC), a notebook computer, or a tablet PC. However, the type of the mobile communication device 100 is not limited in the present invention.

The microprocessor 102 is a hardware (for example, a chipset or a processor) having a computing capability for controlling the overall operation of the mobile communication device 100. In the present exemplary embodiment, the microprocessor 102 is a central processing unit (CPU), a programmable microprocessor, a digital signal processor (DSP), a programmable controller, an application specific integrated circuit (ASIC), a programmable logic device (PLD), or any other similar device.

The wireless communication unit 104 is coupled to the microprocessor 102. The wireless communication unit 104 receives packets to be transmitted to the mobile communication device 100 from other wireless communication devices or transmits packets to be sent by the mobile communication device 100 to other wireless communication devices. The wireless communication unit 104 may include a wireless network chip supporting wireless network transmission and/or a mobile communication chip supporting a mobile communication network.

The buffer memory 106 is coupled to the microprocessor 102 for temporarily storing data and program instructions. The buffer memory 106 may be a dynamic random access memory (DRAM), a static random access memory (SRAM), or a memory capable of temporarily storing data.

The embedded storage unit 108 is coupled to the microprocessor 102. The embedded storage unit 108 may be a random access memory (RAM), a read-only memory (ROM), a flash memory, or a magnetic disk storage device. In the present exemplary embodiment, the embedded storage unit 108 stores one or more programs, applications, and operating systems for controlling the operation of the mobile communication device 100.

The external device interface unit 110 is coupled to the microprocessor 102 and configured to couple an external storage device. In the present exemplary embodiment, the external device interface unit 110 complies with the secure digital (SD) interface standard. However, the present invention is not limited thereto, and the external device interface unit 110 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the serial advanced technology attachment (SATA) standard, the ultra high speed-I (UHS-I) interface standard, the ultra high speed-II (UHS-II) interface standard, the memory stick (MS) interface standard, the multi media card (MMC) interface standard, the embedded multimedia card (eMMC) interface standard, the universal flash storage (UFS) interface standard, the compact flash (CF) interface standard, the integrated device electronics (IDE) standard, or any other suitable standard.

The memory storage device 112 is detachably coupled to the external device interface unit 110. In the present exemplary embodiment, the memory storage device 112 is a SD card. However, the present invention is not limited thereto, and in another exemplary embodiment, the memory storage device 112 may also be a flash drive, a solid state drive (SSD), a MMC card, a MS card, a CF card, or any other memory storage device.

The security unit 114 is configured to activate the data protecting function of the mobile communication device 100. In particular, the security unit 114 instructs the memory storage device 112 to perform a data protecting operation according to a wireless data packet received from a user, so as to prevent data stored in the memory storage device 112 from being read by any unauthorized user. In the present exemplary embodiment, the security unit 114 is an application installed in the embedded storage unit 108, and when the mobile communication device 100 is turned on, the application is automatically loaded from the embedded storage unit 108 into the buffer memory 106 to enable the data protecting function. The operation mechanism of the security unit 114 will be explained in detail later on with reference to accompanying drawings.

The output unit 116 and the input unit 118 are coupled to the microprocessor 102. The output unit 116 is configured to display an operation interface of the mobile communication device 100, and the input unit 118 is configured to provide user input commands. In the present exemplary embodiment, the output unit 116 is a liquid crystal display (LCD), and the input unit 118 is a touch panel on the LCD. However, the present invention is not limited thereto.

Figure 2:
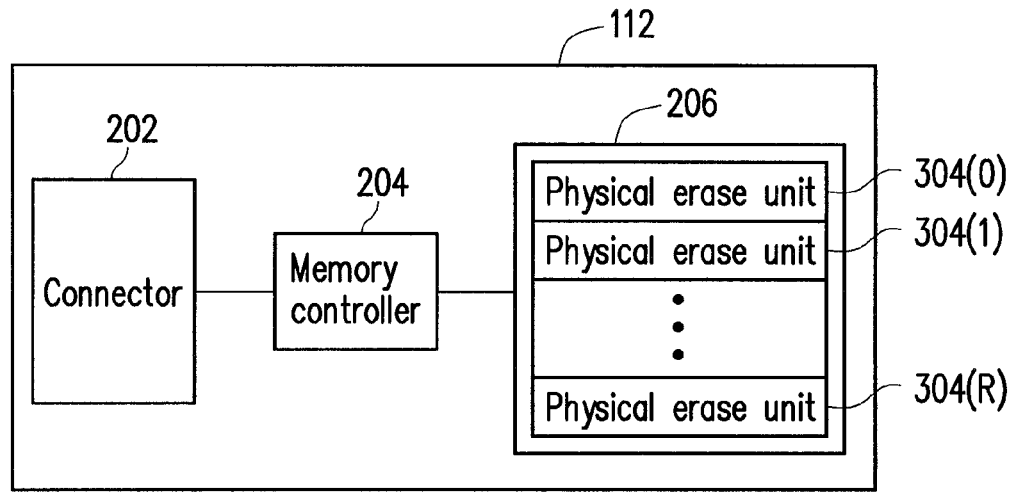
FIG. 2 is a schematic block diagram of a memory storage device according to an exemplary embodiment of the present invention.

FIG. 2 is a schematic block diagram of a memory storage device according to an exemplary embodiment of the present invention. It should be understood that the structure of the memory storage device illustrated in FIG. 2 is only an example and is not intended to limit the scope of the invention.

Referring to FIG. 2, the memory storage device 112 includes a connector 202, a memory controller 204, and a rewritable non-volatile memory module 206.

In the present exemplary embodiment, the connector 202 complies with the SD interface standard. However, the present invention is not limited thereto, and the connector 202 may also comply with the PATA standard, the IEEE 1394 standard, the PCI express standard, the USB standard, the SATA standard, the UHS-I interface standard, the UHS-II interface standard, the MS interface standard, the MMC interface standard, the eMMC interface standard, the UFS interface standard, the CF interface standard, the IDE standard, or any other suitable standard.

The memory controller 204 executes a plurality of logic gates or control instructions implemented in a hardware form or a firmware form and performs data writing, reading, and erasing operations on the rewritable non-volatile memory module 206 according to commands issued by the mobile communication device 100.

The rewritable non-volatile memory module 206 is coupled to the memory controller 204 and configured to store data written by the mobile communication device 100. The rewritable non-volatile memory module 206 has physical erase units 304(0)-304(R). The physical erase units 304(0)-304(R) may belong to the same memory die or different memory dies. Each physical erase unit has a plurality of physical program units, and those physical program units belonging to the same physical erase unit can be individually written but have to be erased all together. Each physical erase unit may be composed of 128 physical program units. However, the present invention is not limited thereto, and each physical erase unit may also be composed of 64 physical program units, 256 physical program units, or any other number of physical program units.

To be specific, a physical erase unit is the smallest erasing unit. Namely, each physical erase unit contains the least number of memory cells that are erased all together. A physical program unit is the smallest programming unit. Namely, each physical program unit is the smallest unit for writing data. Each physical program unit usually includes a data bit area and a redundant bit area. The data bit area includes a plurality of physical access addresses for storing user data, and the redundant bit area is used for storing system data (for example, control information and error checking and correcting (ECC) codes). In the present exemplary embodiment, the data bit area of each physical program unit has 4 physical access addresses, and the capacity of each physical access address is 512 bytes. However, the capacity and number of physical access addresses are not limited in the present invention, and in other exemplary embodiments, a data bit area may have more or fewer physical access addresses. For example, in an exemplary embodiment, a physical erase unit is a physical block, and a physical program unit is a physical page or a physical sector. However, the present invention is not limited thereto.

In the present exemplary embodiment, the rewritable non-volatile memory module 206 is a multi level cell (MLC) NAND flash memory module (i.e., each memory cell thereof stores data of at least 2 bits). However, the present invention is not limited thereto, and the rewritable non-volatile memory module 206 may also be a single level cell (SLC) NAND flash memory module, a trinary level cell (TLC) NAND flash memory module, any other type of flash memory module, or any other memory module with the same characteristics.

Figure 3:
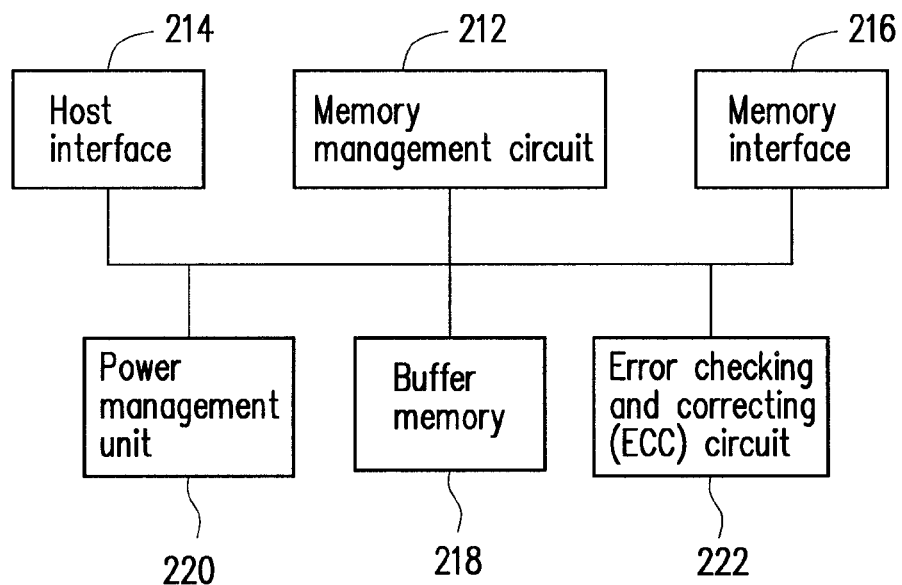
FIG. 3 is a schematic block diagram of a memory controller according to an exemplary embodiment of the present invention.

FIG. 3 is a schematic block diagram of a memory controller according to an exemplary embodiment of the invention. It should be understood that the structure of the memory controller illustrated in FIG. 3 is only an example and is not intended to limit the scope of the present invention.

Referring to FIG. 3, the memory controller 204 includes a memory management circuit 212, a host interface 214, and a memory interface 216.

The memory management circuit 212 controls the overall operation of the memory controller 204. To be specific, the memory management circuit 212 has a plurality of control instructions, and when the memory storage device 112 is in operation, the control instructions are executed to perform data writing, reading, and erasing operations.

In the present exemplary embodiment, the control instructions of the memory management circuit 212 are implemented in a firmware form. For example, the memory management circuit 212 has a microprocessor unit (not shown) and a ROM (not shown), and the control instructions are burnt into the ROM. When the memory storage device 112 is in operation, the control instructions are executed by the microprocessor unit to perform data writing, reading, and erasing operations.

In another exemplary embodiment of the invention, the control instructions of the memory management circuit 212 may also be stored in a specific area of the rewritable non-volatile memory module 206 (for example, a system area exclusively used for storing system data in a memory module) as program codes. In addition, the memory management circuit 212 has a microprocessor unit (not shown), a ROM (not shown), and a RAM (not shown). In particular, the ROM has a driving code segment. When the memory controller 204 is enabled, the microprocessor unit first executes the driving code segment to load the control instructions from the rewritable non-volatile memory module 206 into the RAM of the memory management circuit 212. After that, the microprocessor unit runs the control instructions to perform data writing, reading, and erasing operations.

In yet another exemplary embodiment of the present invention, the control instructions of the memory management circuit 212 may also be implemented in a hardware form. For example, the memory management circuit 212 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the physical erase units of the rewritable non-volatile memory module 206. The memory writing circuit is configured to issue a write command to the rewritable non-volatile memory module 206 to write data into the rewritable non-volatile memory module 206. The memory reading circuit is configured to issue a read command to the rewritable non-volatile memory module 206 to read data from the rewritable non-volatile memory module 206. The memory erasing circuit is configured to issue an erase command to the rewritable non-volatile memory module 206 to erase data from the rewritable non-volatile memory module 206. The data processing circuit is configured to process data to be written into and read from the rewritable non-volatile memory module 206.

The host interface 214 is coupled to the memory management circuit 212 and configured to receive and identify commands and data from the mobile communication device 100. Namely, commands and data transmitted by the mobile communication device 100 are transmitted to the memory management circuit 212 through the host interface 214. In the present exemplary embodiment, the host interface 214 complies with the SD standard. However, the invention is not limited thereto, and the host interface 214 may also comply with the PATA standard, the IEEE 1394 standard, the PCI express standard, the USB standard, the SATA standard, the UHS-I interface standard, the UHS-II interface standard, the MS standard, the MMC standard, the eMMC interface standard, the UFS interface standard, the CF standard, the IDE standard, or any other suitable data transmission standard.

The memory interface 216 is coupled to the memory management circuit 212 and configured to access the rewritable non-volatile memory module 206. Namely, data to be written into the rewritable non-volatile memory module 206 is converted by the memory interface 216 into a format acceptable to the rewritable non-volatile memory module 206.

In an exemplary embodiment of the invention, the memory controller 204 further includes a buffer memory 218, a power management circuit 220, and an ECC circuit 222.

The buffer memory 218 is coupled to the memory management circuit 212 and configured to temporarily store data and commands from the mobile communication device 100 or data from the rewritable non-volatile memory module 206. The buffer memory 218 may be a DRAM, a SRAM, or any other suitable memory.

The power management circuit 220 is coupled to the memory management circuit 212 and configured to control the power supply of the memory storage device 112.

The ECC circuit 222 is coupled to the memory management circuit 212 and configured to perform an ECC procedure to ensure data accuracy. In the present exemplary embodiment, when the memory management circuit 212 receives a write command from the mobile communication device 100, the ECC circuit 222 generates a corresponding ECC code for the data corresponding to the write command, and the memory management circuit 212 writes the data corresponding to the write command and the corresponding ECC code into the rewritable non-volatile memory module 206. Subsequently, when the memory management circuit 212 reads the data from the rewritable non-volatile memory module 206, it also reads the ECC code corresponding to the data, and the ECC circuit 222 performs the ECC procedure on the data according to the ECC code. To be specific, the ECC circuit 222 is designed to correct a specific number of error bits (referred to as a maximum correctable error bit number thereinafter). For example, the maximum correctable error bit number is 24. If the number of error bits in the data is not greater than 24, the ECC circuit 222 can correct the values of the error bits according to the corresponding ECC code. Otherwise, the ECC circuit 222 reports that the ECC procedure fails, and the memory management circuit 212 sends a message indicating that the data is lost to the mobile communication device 100.

In the present exemplary embodiment, when the security unit 114 is run on the mobile communication device 100 for the first time, the security unit 114 displays a setting interface on the output unit 116 such that a user can activate the data protecting function of the mobile communication device 100 and set authentication information to be used in subsequent data protecting operation.

Figure 4:
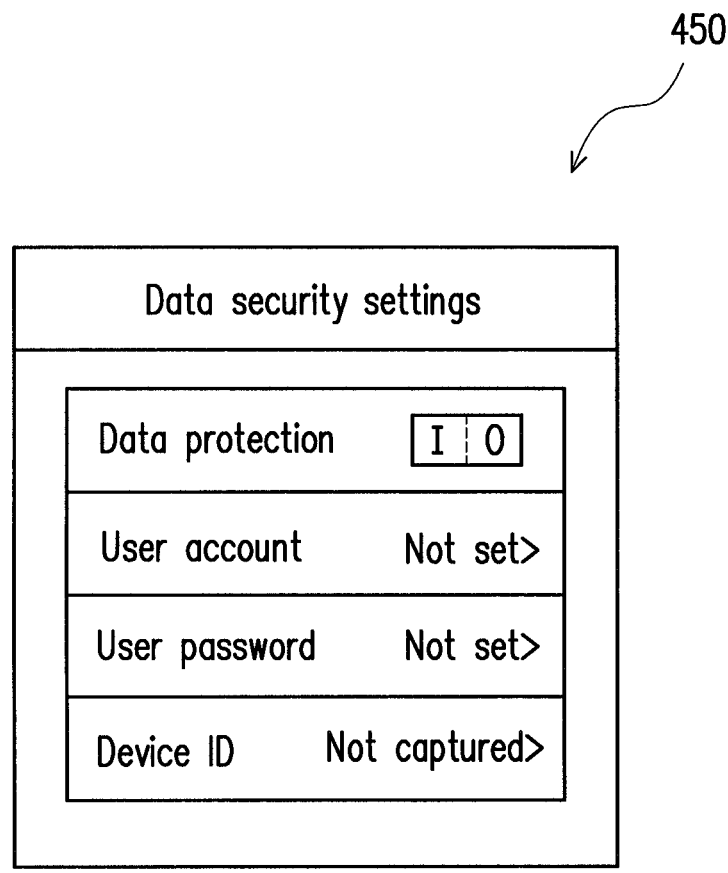
FIG. 4 is a diagram illustrating an example of a setting interface according to an exemplary embodiment of the present invention.

FIG. 4 is a diagram illustrating an example of a setting interface according to an exemplary embodiment of the invention.

Referring to FIG. 4, the setting interface 450 includes a data protecting function on/off setting module, a user account setting module, a user password setting module, and a device identity (ID) capturing module.

When the user activates the data protecting function through the setting interface 450, the security unit 114 requests the user to set up a user account and a user password, and the security unit 114 captures a device ID of the mobile communication device 100. In the present exemplary embodiment, the device ID of the mobile communication device 100 is an international mobile equipment identity (IMEI). However, the present invention is not limited thereto, and the device ID of the mobile communication device 100 can be any code for identifying the mobile communication device 100. Additionally, in the present exemplary embodiment, the user may also set up or modify the user account and the user password through the user account setting module and the user password setting module first and then activate the data protecting function.

Figure 5:
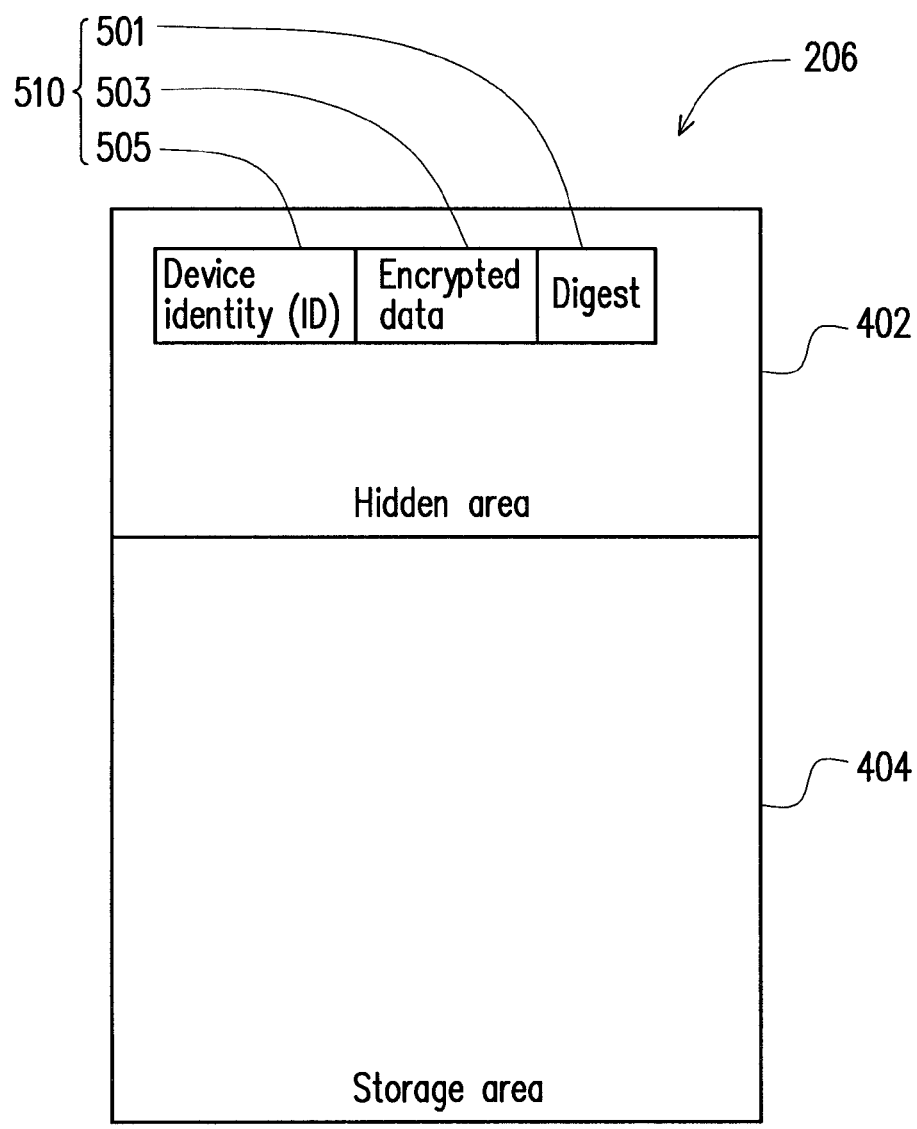
FIG. 5 is a diagram illustrating how a rewritable non-volatile memory module is planned according to an exemplary embodiment of the present invention.

In the present exemplary embodiment, the security unit 114 encodes the user account and the user password set up by the user through a one-way hash encoding unit to generate a corresponding digest 501, the security unit 114 encrypts the user account and the user password set up by the user through an encryption unit to generate an encrypted data 503. Besides, the security unit 114 integrates the digest 501, the encrypted data 503, and the device ID 505 into authentication information 510 and stores the authentication information 510 into the memory storage device 112 (as shown in FIG. 5). In the present exemplary embodiment, the one-way hash encoding unit may be implemented as a one-way hash function with program codes, and the encryption unit may be implemented as an encryption function with program codes. The one-way hash function may be MD5, RIPEMD-160, SHA1, SHA386, SHA512, or any other suitable function, and the encryption function may be advanced encryption standard (AES) 128, AES256, data encryption standard (DES), or any other encryption function. However, the invention is not limited thereto.

In the present exemplary embodiment, the memory controller 204 groups the physical erase units of the rewritable non-volatile memory module 206 into a hidden area 402 and a storage area 404 (as shown in FIG. 5). The hidden area 402 can only be accessed by the memory controller 204, and the operating system of the mobile communication device 100 cannot identify or access the hidden area 402. The storage area 404 is accessed by the operating system and applications of the mobile communication device 100. The physical erase units in the storage area may be categorized into data physical erase units and free physical erase units to be alternatively used by the operating system and the applications of the mobile communication device 100 for writing data.

In the present exemplary embodiment, the security unit 114 instructs the memory controller 204 to store the authentication information 510 into the hidden area 402 to prevent the data from being misappropriated.

After the data protecting function is activated and related settings are done, the security unit 114 keeps monitoring any data packet received by the wireless communication unit 104 as long as the mobile communication device 100 is in the turned-on state. Besides, when a data packet containing a data security instruction is received, the security unit 114 parses the data packet to obtain the authentication information and transmits the authentication information to the memory storage device 112, and the memory storage device 112 determines whether to perform a data protecting operation to prevent the data stored in the memory storage device 112 from being read.

Figure 6:
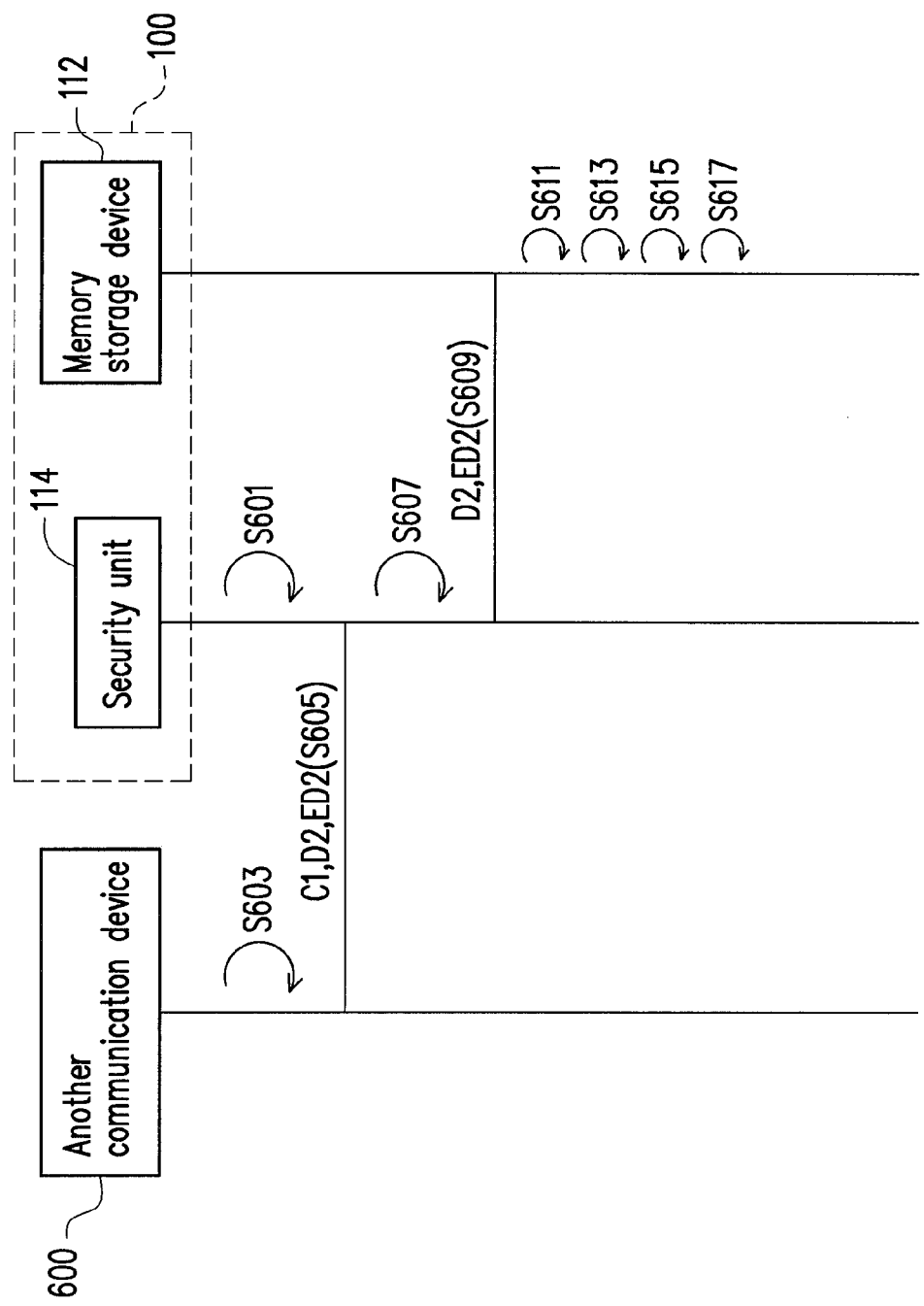
FIG. 6 is a diagram illustrating an information flow for activating a mobile communication device to execute a data protecting method according to an exemplary embodiment of the present invention.

FIG. 6 is a diagram illustrating an information flow for activating the mobile communication device 100 to execute a data protecting method according to an exemplary embodiment of the present invention.

Referring to FIG. 6, when the mobile communication device 100 is in the turned-on state, the security unit 114 constantly monitors any data packet received by the mobile communication device 100 (S601).

If the user (i.e., the owner of the mobile communication device 100) lost the mobile communication device 100, the user can input his or her account and password and generate corresponding digest D2 and encrypted data ED2 through another communication device 600 (S603). To be specific, the user can use the communication device 600 to encode the account and password through the same one-way hash function used by the security unit 114 to generate the corresponding digest D2 and encrypt the account and password through the same encryption function used by the security unit 114 to generate the corresponding encrypted data ED2.

After that, the user integrates the digest D2 and the encrypted data ED2 into authentication information and sends the authentication information to the mobile communication device 100 (S605).

In the present exemplary embodiment, the user may transmit the data security instruction C1, the digest D2, and the encrypted data ED2 to the mobile communication device 100 as a short message by using the communication device 600. To be specific, the user may transmit a short message containing the data security instruction C1, the digest D2, and the encrypted data ED2 to the mobile communication device 100 by inputting the phone number of the mobile communication device 100 into a short message service (SMS) system.

It should be mentioned that the present invention is not limited to the present exemplary embodiment, and in another exemplary embodiment of the invention, the digest D2 and the encrypted data ED2 may also be transmitted to the mobile communication device 100 through a mobile communication data network or a wireless network. For example, when the mobile communication device 100 is turned on, it automatically logs into a proxy server and continuously reports its current Internet protocol (IP) address to the proxy server. Accordingly, the user can transmit the data packet containing the data security instruction C1, the digest D2, and the encrypted data ED2 to the mobile communication device 100 via a mobile communication data network or a wireless network.

When the mobile communication device 100 receives a data packet containing the data security instruction C1, the digest D2, and the encrypted data ED2, the security unit 114 intercepts the data packet according to the data security instruction C1 and parses the content of the data packet to obtain the digest D2 and the encrypted data ED2 (S607).

After that, the security unit 114 transmits the digest D2 and the encrypted data ED2 to the memory storage device 112 (S609).

When the memory storage device 112 receives the digest D2 and the encrypted data ED2 from the security unit 114, the memory controller 204 decrypts the encrypted data ED2 to obtain the account and the password of the encrypted data ED2 (S611). In addition, the memory controller 204 decrypts the encrypted data 503 stored in the hidden area 402 to obtain a user account and a user password (S613). Next, the memory controller 204 determines whether the digest D2 matches the digest 501 in the hidden area 402, whether the account in the encrypted data ED2 matches the user account, and whether the password in the encrypted data ED2 matches the user password (S615). If the digest D2 matches the digest 501 in the hidden area 402, the account in the encrypted data ED2 matches the user account, and the password in the encrypted data ED2 matches the user password, the memory controller 204 performs a data security operation to prevent data stored in the storage area 404 of the rewritable non-volatile memory module 206 from being read.

For example, in the present exemplary embodiment, when the digest D2 matches the digest 501 in the hidden area 402, the account in the encrypted data ED2 matches the user account, and the password in the encrypted data ED2 matches the user password, the memory controller 204 deletes the files and directories stored in the storage area 404 so that the operating system or applications of the mobile communication device 100 cannot read any data from the storage area 404. It should be mentioned that the deletion of the files and directories in the storage area 404 is only an example of the data security operation but not intended to limit the scope of the present invention, and any mechanism capable of preventing the data in the storage area 404 from being read can be applied to the present invention. For example, in another exemplary embodiment, the memory controller 204 may also re-format the storage area 404 to delete the data originally stored in the storage area 404, so as to achieve the data protection purpose. Or, the memory controller 204 may also clear file allocation information (for example, a file allocation table) of the storage area 404 so that the operating system of the mobile communication device 100 cannot obtain the corresponding link or read files stored in the storage area 404. Or, the memory controller 204 may encrypt the data stored in the storage area 404 by using an encryption algorithm, so that the operating system or applications of the mobile communication device 100 cannot identify the data read from the storage area 404. Moreover, the memory controller 204 may repeatedly overwrite the data stored in the storage area 404 with random numbers to ensure that the original data cannot be restored.

Furthermore, in yet another exemplary embodiment, the memory controller 204 may also create an image of the storage area containing no user data and stores the image into a backup data area in advance. For example, the memory controller 204 defines the backup data area in the hidden area 402. After that, if the digest D2 matches the digest 501 in the hidden area 402, the account in the encrypted data ED2 matches the user account, and the password in the encrypted data ED2 matches the user password, the memory controller 204 executes a restore command to write the backup data from the backup data area into the storage area 404, so as to prevent the data in the storage area 404 from being read.

Thereby, if the account and the password input in step S603 match the original user account and user password, the digest D2 matches the digest 501 in the hidden area 402. Accordingly, after confirming that the data packet is transmitted by the owner of the mobile communication device 100, the memory storage device 106 activates a protection measure to prevent the stored data from being read.

When the mobile communication device 100 is lost and picked up by someone, data in the memory storage device 112 may be read by placing the memory storage device 112 in another machine. To prevent such misappropriation, in another exemplary embodiment of the present invention, the memory controller 204 further determines whether the current device ID matches the device ID 505 stored in the hidden area 402 when it receives a read command, and only when the current device ID matches the device ID 505 stored in the hidden area 402, the memory controller 204 reads data from the storage area 404 and transmits the data in response to the read command. Contrarily, if the current device ID does not match the device ID 505 stored in the hidden area 402, the memory controller 204 transmits a predetermined data in response to the read command. To be specific, in the mobile communication device 100 with the security unit 114, every time when data is read from the storage area 404 of the memory storage device 112, the security unit 114 captures the device ID of the mobile communication device 100 and transmits the device ID to the memory controller 204. Accordingly, the memory controller 204 can identify whether the read command is issued by the mobile communication device 100. Namely, after activating the data protecting function through the setting interface illustrated in FIG. 4, data in the memory storage device 112 can only be read through the mobile communication device 100.

In the present exemplary embodiment, the predetermined data may be a data stream with each bit being 0x00 or 0xFF or any other insignificant data stream.

Figure 7:
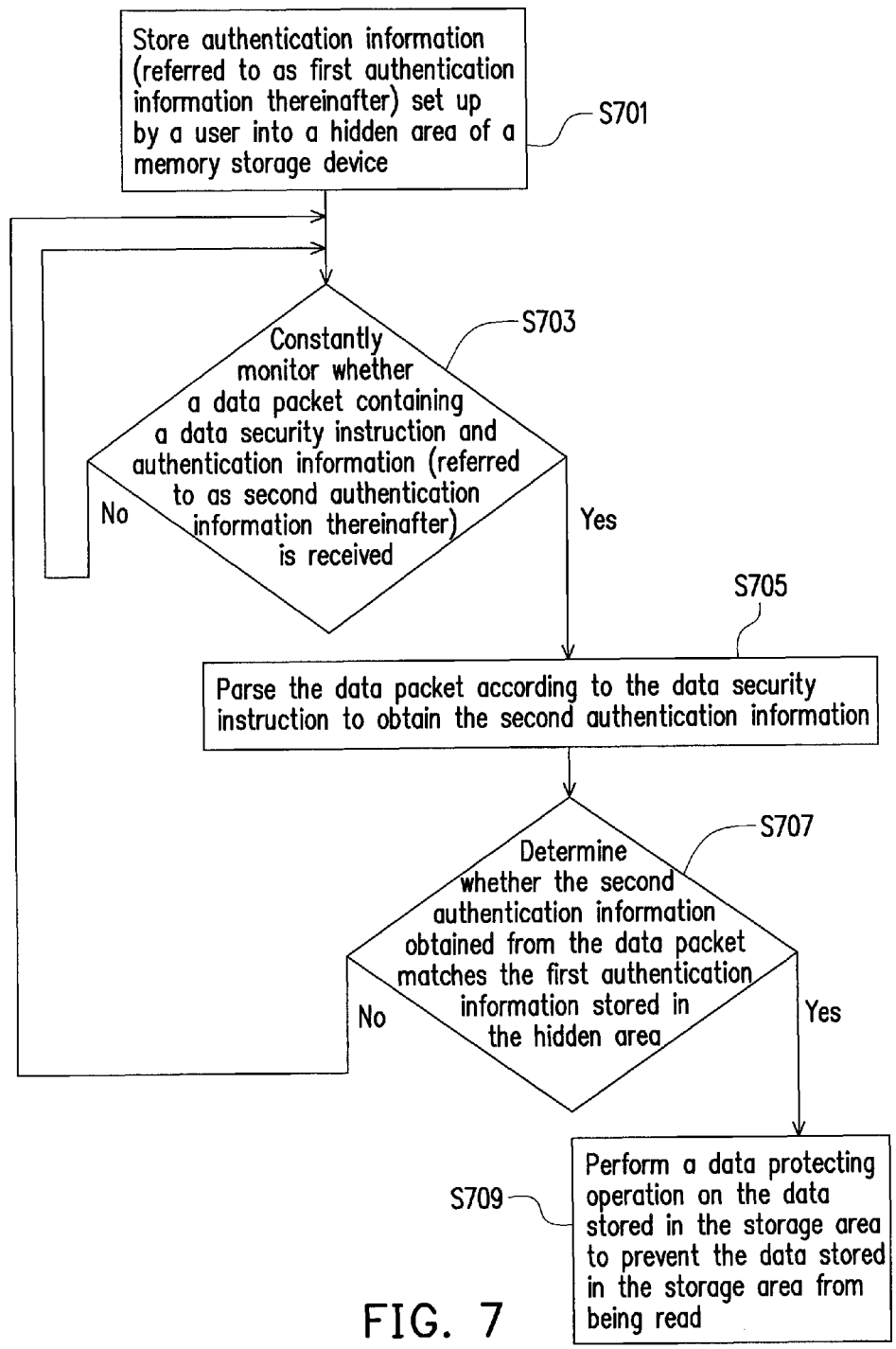
FIG. 7 is a flowchart of a data protecting method according to an exemplary embodiment of the present invention.

FIG. 7 is a flowchart of a data protecting method according to an exemplary embodiment of the present invention.

Referring to FIG. 7, in step S701, an authentication information (referred to as a first authentication information thereinafter) set up by a user is stored into the hidden area 402 of the memory storage device 112. The technique of generating the first authentication information and storing the first authentication information into the hidden area 402 has been described above in detail with reference to accompanying drawings therefore will not be described herein.

In step S703, whether a data packet containing a data security instruction and an authentication information (referred to as a second authentication information thereinafter) is received is constantly monitored.

If a data packet containing the data security instruction and the second authentication information is received, in step S705, the data packet is parsed according to the data security instruction to obtain the second authentication information.

Next, in step S707, whether the second authentication information obtained from the data packet matches the first authentication information stored in the hidden area 402 is determined. The technique of determining whether the second authentication information obtained from the data packet matches the first authentication information stored in the hidden area 402 has been described above in detail with reference to FIG. 6 therefore will not be described herein.

If the second authentication information obtained from the data packet matches the first authentication information stored in the hidden area 402, in step S709, the memory storage device 112 performs a data protecting operation on the data stored in the storage area 404 to prevent the data stored in the storage area 404 from being read.

Contrarily, if the second authentication information obtained from the data packet does not match the first authentication information stored in the hidden area 402, step S703 is executed again. Besides, every time when the mobile communication device 100 is turned on, step S703 is executed until the mobile communication device 100 is turned off.

It should be mentioned that in the present exemplary embodiment, the security unit 114 is implemented as an application. However, the present invention is not limited thereto, and in another exemplary embodiment, the security unit 114 may also be implemented as a hardware circuit.

Figure 8:
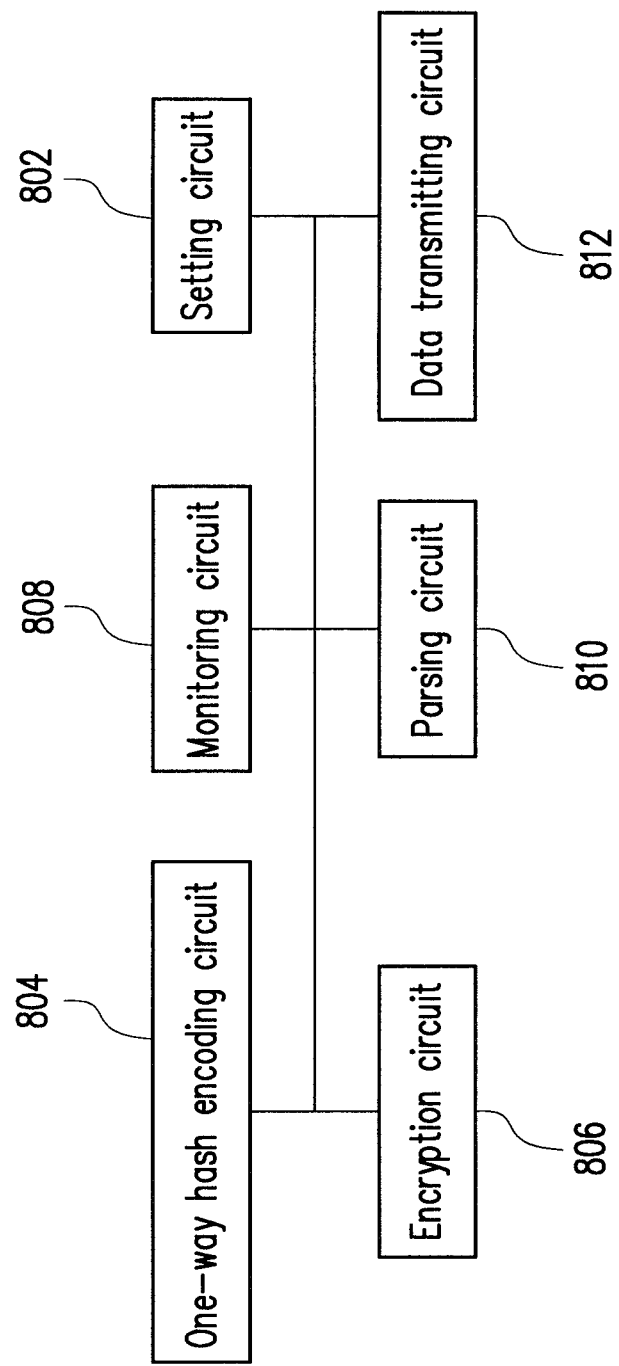
FIG. 8 is a schematic block diagram of a security unit according to another exemplary embodiment of the present invention.

FIG. 8 is a schematic block diagram of a security unit according to another exemplary embodiment of the present invention.

Referring to FIG. 8, the security unit includes a setting circuit 802, a one-way hash encoding circuit 804, an encryption circuit 806, a monitoring circuit 808, a parsing circuit 810, and a data transmitting circuit 812.

The setting circuit 802 receives a user account and a user password set up by a user and activates/deactivates a data protecting function according to the user's requirement.

The one-way hash encoding circuit 804 encodes the user account and the user password received by the setting circuit 802 by using a one-way hash function to generate a corresponding digest.

The encryption circuit 806 encrypts the user account and the user password received by the setting circuit 802 by using an encryption function to generate a corresponding encrypted data.

The monitoring circuit 808 constantly monitors data packets received by the wireless communication unit 104 to identify the data packet containing a data security instruction.

The parsing circuit 810 parses the data packet containing the data security instruction to obtain information carried by the data packet.

The data transmitting circuit 812 transmits predetermined authentication information or the authentication information obtained by the parsing circuit 810 to the memory storage device 112.

As described above, in the data protecting method, the mobile communication device, and the memory storage device provided by exemplary embodiments of the present invention, the data security operation is performed according to a data packet received from a user. Accordingly, when the mobile communication device is lost, the user can instantly protect any personal data stored in the mobile communication device to prevent the data from being misappropriated. Additionally, in another exemplary embodiment of the present invention, when a memory storage device paired with the mobile communication device is placed in another machine to be read, the memory storage device executes a data security operation due to unmatched device IDs. Thereby, personal data stored in the memory storage device is effectively protected from misappropriation. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data protecting method for a mobile communication device, wherein the mobile communication device comprises a security unit, a wireless communication unit, and an external device interface unit, and a memory storage device is detachably coupled to the external device interface unit, the data protecting method comprising:
   storing a first authentication information into a hidden area of the memory storage device by using the security unit;
   receiving a data packet by using the wireless communication unit, wherein the data packet comprises a data security instruction and a second authentication information;
   parsing the data packet by using the security unit according to the data security instruction to obtain the second authentication information;
   determining whether the second authentication information obtained from the data packet matches the first authentication information stored in the hidden area by using the memory storage device; and
   if the second authentication information obtained from the data packet matches the first authentication information stored in the hidden area, performing a data protecting operation on data stored in a storage area of the memory storage device by using the memory storage device to prevent the data stored in the storage area from being read,
   wherein the first authentication information comprises a first digest, a first encrypted data, and a device identity (ID) of the mobile communication device,
   wherein the step of storing the first authentication information into the hidden area of the memory storage device comprises:
   obtaining the device ID of the mobile communication device by using the security unit;
   receiving a user account and a user password to be set by using the security unit;
   encoding the user account and the user password by using the security unit through a one-way hash encoding unit to generate the first digest;
   encrypting the user account and the user password by using the security unit through an encryption unit to generate the first encrypted data; and
   writing the device ID, the first digest, and the first encrypted data into the hidden area of the memory storage device by using the security unit.

2. The data protecting method according to claim 1, wherein the data packet is transmitted to the wireless communication unit through a short message service (SMS) system.

3. The data protecting method according to claim 1, wherein the data packet is transmitted to the wireless communication unit through a mobile communication data network or a wireless network.

4. The data protecting method according to claim 1, wherein the second authentication information comprises a second digest and a second encrypted data,
   wherein the step of determining whether the second authentication information obtained from the data packet matches the first authentication information stored in the hidden area by using the memory storage device comprises:
   decrypting the second encrypted data to obtain an account and a password;
   decrypting the first encrypted data to obtain the user account and the user password;
   determining whether the second digest matches the first digest stored in the hidden area;
   if the second digest matches the first digest stored in the hidden area, determining whether the user account matches the account and whether the user password matches the password; and
   if the user account matches the account and the user password matches the password, identifying that the second authentication information obtained from the data packet matches the first authentication information stored in the hidden area.

5. The data protecting method according to claim 1 further comprising:
   while reading data from the storage area in response to a read command, reading a current device ID from the mobile communication device by using the security unit, and determining whether the current device ID read by the security unit matches the device ID stored in the hidden area by using the memory storage device; and
   if the current device ID read by the security unit does not match the device ID stored in the hidden area, transmitting a predetermined data in response to the read command.

6. The data protecting method according to claim 1, wherein the data protecting operation comprises:
   deleting files and directories stored in the storage area, formatting the storage area, clearing a file allocation information corresponding to the storage area, encrypting data stored in the storage area, or overwriting the data stored in the storage area with a random number.

7. The data protecting method according to claim 1 further comprising:
   configuring a backup data area in the hidden area; and
   generating an image corresponding to the storage area storing no user data, and storing the image into the backup data area as a backup data,
   wherein the data protecting operation comprises: executing a restore command to write the backup data from the backup data area into the storage area.

8. A mobile communication device, comprising:
   a microprocessor;
   a wireless communication unit, coupled to the microprocessor; and
   an external device interface unit, coupled to the microprocessor, wherein a memory storage device is detachably coupled to the external device interface unit; and
   a security circuit, coupled to the microprocessor, and storing a first authentication information into a hidden area of the memory storage device,
   wherein the wireless communication unit receives a data packet, and the data packet comprises a data security instruction and a second authentication information;
   wherein the security circuit parses the data packet according to the data security instruction to obtain the second authentication information, and the memory storage device determines whether the second authentication information obtained from the data packet matches the first authentication information stored in the hidden area, wherein if the second authentication information obtained from the data packet matches the first authentication information stored in the hidden area, the memory storage device performs a data protecting operation on data stored in a storage area to prevent the data stored in the storage area from being read, wherein the first authentication information comprises a first digest, a first encrypted data, and a device ID of the mobile communication device, while storing the first authentication information into the hidden area of the memory storage device, the security circuit obtains the device ID of the mobile communication device, receives a user account and a user password to be set, encodes the user account and the user password through a one-way hash encoding unit to generate the first digest, encrypts the user account and the user password through an encryption unit to generate the first encrypted data, and stores the device ID, the first digest, and the first encrypted data into the hidden area of the memory storage device.

9. The mobile communication device according to claim 8, wherein the wireless communication unit receives the data packet through a SMS system.

10. The mobile communication device according to claim 8, wherein the wireless communication unit receives the data packet through a mobile communication data network or a wireless network.

11. The mobile communication device according to claim 8, wherein the second authentication information comprises a second digest and a second encrypted data, wherein while determining whether the second authentication information obtained from the data packet matches the first authentication information stored in the hidden area, the memory storage device decrypts the second encrypted data to obtain an account and a password, decrypts the first encrypted data to obtain the user account and the user password, and determines whether the second digest matches the first digest stored in the hidden area, wherein if the second digest matches the first digest stored in the hidden area, the memory storage device further determines whether the user account matches the account and whether the user password matches the password, wherein if the user account matches the account and the user password matches the password, the memory storage device identifies that the second authentication information obtained from the data packet matches the first authentication information stored in the hidden area.

12. The mobile communication device according to claim 8, wherein while reading data from the storage area in response to a read command, the security circuit reads a current device ID from the mobile communication device, and the memory storage device determines whether the current device ID read by the security circuit matches the device ID stored in the hidden area, if the current device ID read by the security circuit does not match the device ID stored in the hidden area, the memory storage device transmits a predetermined data in response to the read command.

13. The mobile communication device according to claim 8, wherein the memory storage device performs the data protecting operation to delete files and directories stored in the storage area, format the storage area, clear a file allocation information corresponding to the storage area, encrypt data stored in the storage area, or overwrite the data stored in the storage area with a random number.

14. The mobile communication device according to claim 8, wherein the memory storage device configures a backup data area in the hidden area, and the memory storage device generates an image corresponding to the storage area storing no user data and stores the image into the backup data area as a backup data, wherein the memory storage device performs the data protecting operation to execute a restore command to write the backup data from the backup data area into the storage area.

15. A memory storage device, comprising:
a connector;
a rewritable non-volatile memory module, comprising a hidden area and a storage area; and
a memory controller, coupled to the connector and the rewritable non-volatile memory module,
wherein the memory controller writes a device ID of a mobile communication device, a first digest, and a first encrypted data into the hidden area, wherein the first digest is generated by encoding a user account and a user password through a one-way hash encoding unit, and the first encrypted data is generated by encrypting the user account and the user password through an encryption unit, wherein the memory controller further receives a second digest and a second encrypted data, decrypts the second encrypted data to obtain an account and a password, decrypts the first encrypted data to obtain the user account and the user password, and determines whether the second digest matches the first digest stored in the hidden area, wherein when the second digest matches the first digest stored in the hidden area, the memory controller further determines whether the user account and the user password match the account and the password, wherein when the user account matches the account and the user password matches the password, the memory controller performs a data protecting operation on data stored in the storage area to prevent the data stored in the storage area from being read, wherein when a read command is received to read data stored in the storage area, the memory controller determines whether a current device ID matches the device ID stored in the hidden area, when the current device ID does not match the device ID stored in the hidden area, the memory controller transmits a predetermined data in response to the read command.

16. The memory storage device according to claim 15, wherein the memory controller performs the data protecting operation to delete files and directories stored in the storage area, format the storage area, clear a file allocation information corresponding to the storage area, encrypt data stored in the storage area, or overwrite the data stored in the storage area with a random number.

17. The memory storage device according to claim 15, wherein the memory controller configures a backup data area in the hidden area, and the memory controller generates an image corresponding to the storage area storing no user data and stores the image into the backup data area as a backup data, wherein the memory controller performs the data protecting operation to execute a restore command to write the backup data from the backup data area into the storage area.

* * * * *